(12) United States Patent
Barefoot

(10) Patent No.: US 11,141,763 B1
(45) Date of Patent: Oct. 12, 2021

(54) SYSTEM FOR SOLIDIFICATION OF PHARMACEUTICAL WASTE

(71) Applicant: Stewart Superabsorbents, LLC, Hickory, NC (US)

(72) Inventor: Quint Barefoot, McLeansville, NC (US)

(73) Assignee: Stewart Superabsorbents, LLC, Hickory, NC (US)

( * ) Notice: Subject to any disclaimer, the term of this patent is extended or adjusted under 35 U.S.C. 154(b) by 0 days.

(21) Appl. No.: 15/279,728

(22) Filed: Sep. 29, 2016

Related U.S. Application Data

(60) Provisional application No. 62/234,191, filed on Sep. 29, 2015.

(51) Int. Cl.
*B09B 3/00* (2006.01)
*B65D 65/46* (2006.01)
*A61J 1/03* (2006.01)

(52) U.S. Cl.
CPC ............... *B09B 3/0075* (2013.01); *A61J 1/03* (2013.01); *B09B 3/0008* (2013.01); *B65D 65/46* (2013.01)

(58) Field of Classification Search
CPC .................................................. B09B 3/0075
See application file for complete search history.

(56) References Cited

U.S. PATENT DOCUMENTS

| | | | |
|---|---|---|---|
| 2,671,602 A | 3/1954 | Vogt | 383/37 |
| 4,419,236 A | 12/1983 | Hsu | 210/282 |
| 4,748,069 A * | 5/1988 | Cullen | D21H 19/20 |
| | | | 428/195.1 |
| 4,749,600 A | 6/1988 | Cullen et al. | 428/34.3 |
| 5,092,858 A * | 3/1992 | Benson | A61M 1/0096 |
| | | | 604/319 |
| 5,284,621 A | 2/1994 | Kaufman | 422/32 |
| 5,391,351 A | 2/1995 | Kaufman | 422/28 |
| 5,424,265 A | 6/1995 | Weinstein | 502/400 |
| 5,635,196 A | 6/1997 | Murphy | 424/409 |
| 5,801,116 A * | 9/1998 | Cottrell | A61L 15/28 |
| | | | 502/401 |
| 6,797,857 B2 | 9/2004 | Tanhehco | 604/368 |
| 7,291,674 B2 | 11/2007 | Kang et al. | 525/54.1 |
| 7,795,345 B2 | 9/2010 | Smith | 524/556 |
| 8,348,056 B2 | 1/2013 | Maness | 206/366 |
| 8,450,389 B1 * | 5/2013 | Barefoot | A61L 2/23 |
| | | | 523/122 |
| 8,573,426 B2 | 11/2013 | Maness | 220/4.12 |
| 9,035,121 B1 * | 5/2015 | Goodsell | B65F 1/002 |
| | | | 588/249.5 |
| 9,044,377 B2 | 6/2015 | Maness | |
| 9,533,081 B1 | 1/2017 | Barefoot | A61M 1/0096 |
| 2004/0144682 A1 | 7/2004 | Altmayer | 206/524.7 |
| 2006/0173430 A1 | 8/2006 | Lee et al. | 604/368 |

(Continued)

*Primary Examiner* — Janine M Kreck
(74) *Attorney, Agent, or Firm* — Fish & Richardson P.C.

(57) ABSTRACT

The invention includes a system for solidification of pharmaceutical wastes. The system may be for use in connection with a container serving as the medication bottle. The system includes an absorbent composition including a plurality of surface cross-linked superabsorbent particles. Additionally, a soluble packet may be included so that the absorbent composition is released upon dissolution of the packet and medication is rendered unavailable. The invention also includes a method of solidifying pharmaceutical waste.

6 Claims, 4 Drawing Sheets

(56) References Cited

U.S. PATENT DOCUMENTS

| | | | |
|---|---|---|---|
| 2008/0058736 A1 | 4/2008 | Reshamwala | 604/319 |
| 2011/0001087 A1 | 1/2011 | Hillebrecht | 252/194 |
| 2014/0183070 A1* | 7/2014 | Holaday | B09B 3/0075 206/221 |
| 2014/0187842 A1* | 7/2014 | Holaday | B09B 3/0075 588/313 |
| 2014/0235917 A1* | 8/2014 | Best | B09B 3/0075 588/259 |

* cited by examiner

SYSTEM FOR SOLIDIFICATION OF PHARMACEUTICAL WASTE

This application claims the benefit of U.S. provisional application No. 62/234,191, filed Sep. 29, 2015, which is incorporated herein by reference.

FIELD OF THE TECHNOLOGY

The present disclosure relates generally to an improved system for solidification of pharmaceutical waste, and more particularly to improved solidification apparatus, systems and methods.

BACKGROUND

It is desirable to provide rapid, safe and effective disposal of pharmaceutical wastes, for example, outdated and/or unused medications. Proper disposal of expired or unused medications has been a healthcare concern and remains an ever growing problem. Flushing medications in the toilet, as often happens in homes, delivers the medication to the public water supply and most public water treatment systems are ill-prepared to filter pharmaceutical wastes. Throwing medications away, for example, in the garbage, may make them available to unintended users. Some suggest combining kitty litter or coffee grounds with left over medications to dispose of the medications. However, even when the pharmaceutical wastes are concealed by kitty litter or coffee grounds, they may still be available to unintended users and may not be deactivated at disposal. Community drug take-back events are infrequent and may not be convenient and/or accessible to all. The complexity and cost associated with currently available pharmaceutical disposal options often make those options difficult and cost prohibitive, resulting collectively in low pharmaceutical disposal rates at such events.

The issue of pharmaceutical wastes has become such a problem that many municipalities and regulating bodies are adopting and/or requiring disposal in accordance with adopted safety regulations. The EPA currently recommends that unwanted medication should not be flushed down toilets because of the lack of public water filtration system capabilities to remove pharmaceuticals from the water supply. Traces of certain drugs are showing up in public drinking water in various municipalities across the country. Several states already have adopted laws prohibiting the flushing of medication in attempts to address this public water issue. The EPA further suggests rendering any medications to be disposed of as undesirable before disposal.

Therefore, Applicants desire alternative cost-effective, user-friendly and convenient pharmaceutical waste devices, systems and methods that meet regulations and safety concerns and cost effectively dispose of waste medications.

SUMMARY

In accordance with the present disclosure, solidification apparatus, systems and methods are provided for disposal of pharmaceutical wastes and the like. This disclosure provides improved solidification apparatus, systems and methods that are convenient, efficient, and safe.

In one embodiment, a packet for solidification of pharmaceutical wastes includes an absorbent composition. The absorbent composition may include a superabsorbent polymer and an agent for making contents solidified by the absorbent composition unsuitable for consumption. The packet may be at least partially soluble in an aqueous liquid to be solidified so that the absorbent composition is contained within the packet and is released upon dissolution of at least a portion of the packet.

The packet may include an adhesive for attaching the packet inside a container. The packet may be made of dissolvable polyvinyl alcohol.

The superabsorbent polymer may be a polymer approved for use as an indirect food additive. The superabsorbent polymer may, by way of example, be from the FAVOR-PAC 500 series.

The agent may be a bittering agent. The bittering agent is, in some examples, Bitrex. The absorbent composition may include about 0.1 g of the bittering agent.

The packet may further include a denaturing agent.

The packet in some examples may be a micro-packet, an example of which is seen in FIG. 4. The micro-packet may house about 1 g or less of superabsorbent polymer. The micro-packet may be sized to fit inside a medication container.

The superabsorbent polymer, in some examples, is surface cross-linked.

Another embodiment of the disclosure includes a solidification system for solidification of pharmaceutical wastes including a container for housing medications, a packet and an absorbent composition. The container has a bottom, side walls and a lid. The packet is sized to fit inside the container along with the medications. The absorbent composition includes a superabsorbent polymer and an agent for making the contents solidified within the container unsuitable for consumption. The packet is at least partially soluble in an aqueous liquid to be solidified so that the absorbent composition is contained within the packet and is released upon dissolution of at least a portion of the packet.

The invention also includes methods for solidification of pharmaceutical wastes by any of the packets or systems described.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
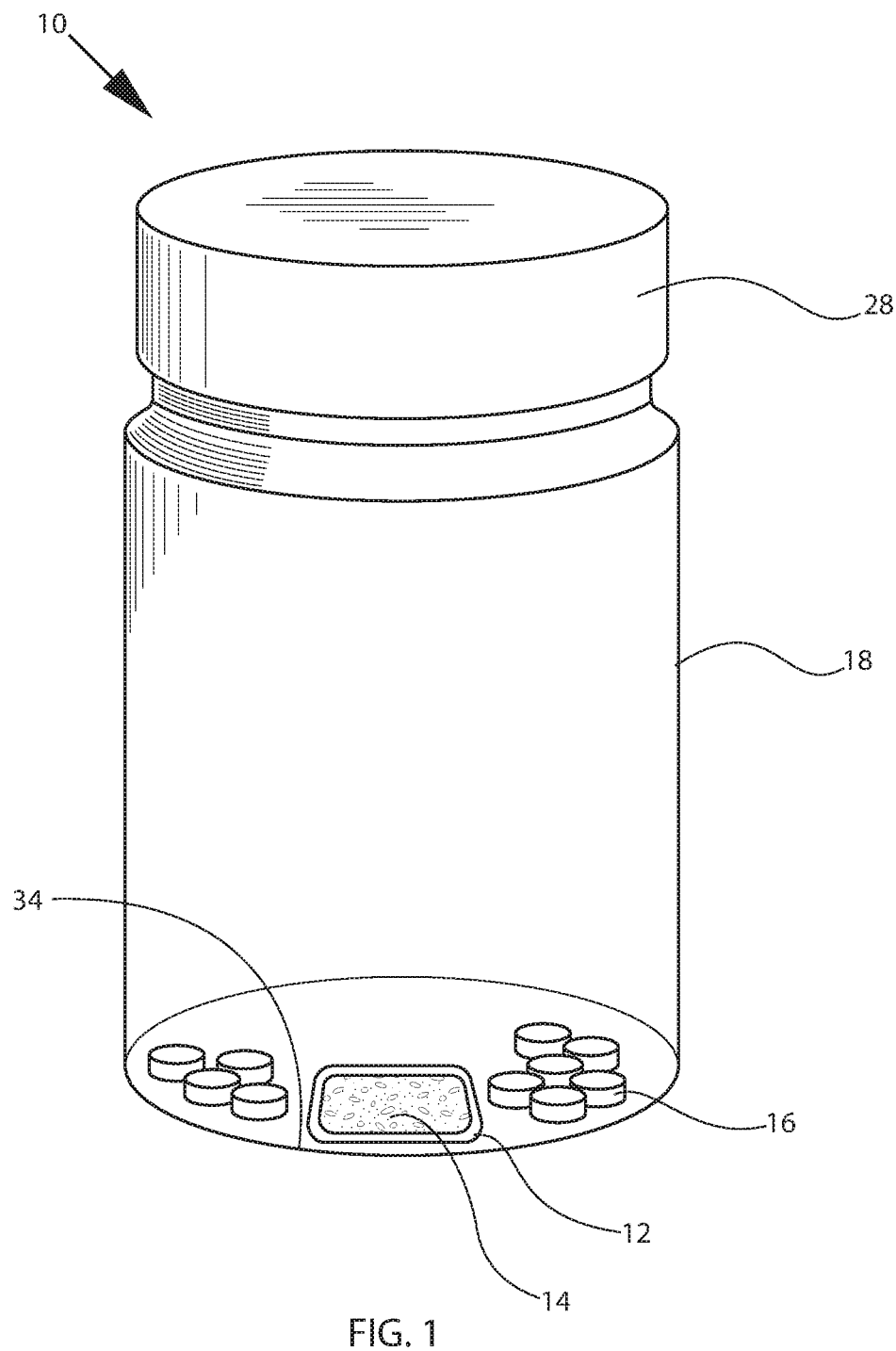
FIG. 1 is a side perspective view of one embodiment of an improved solidification system for pharmaceutical waste according to the disclosure.
Figure 2:
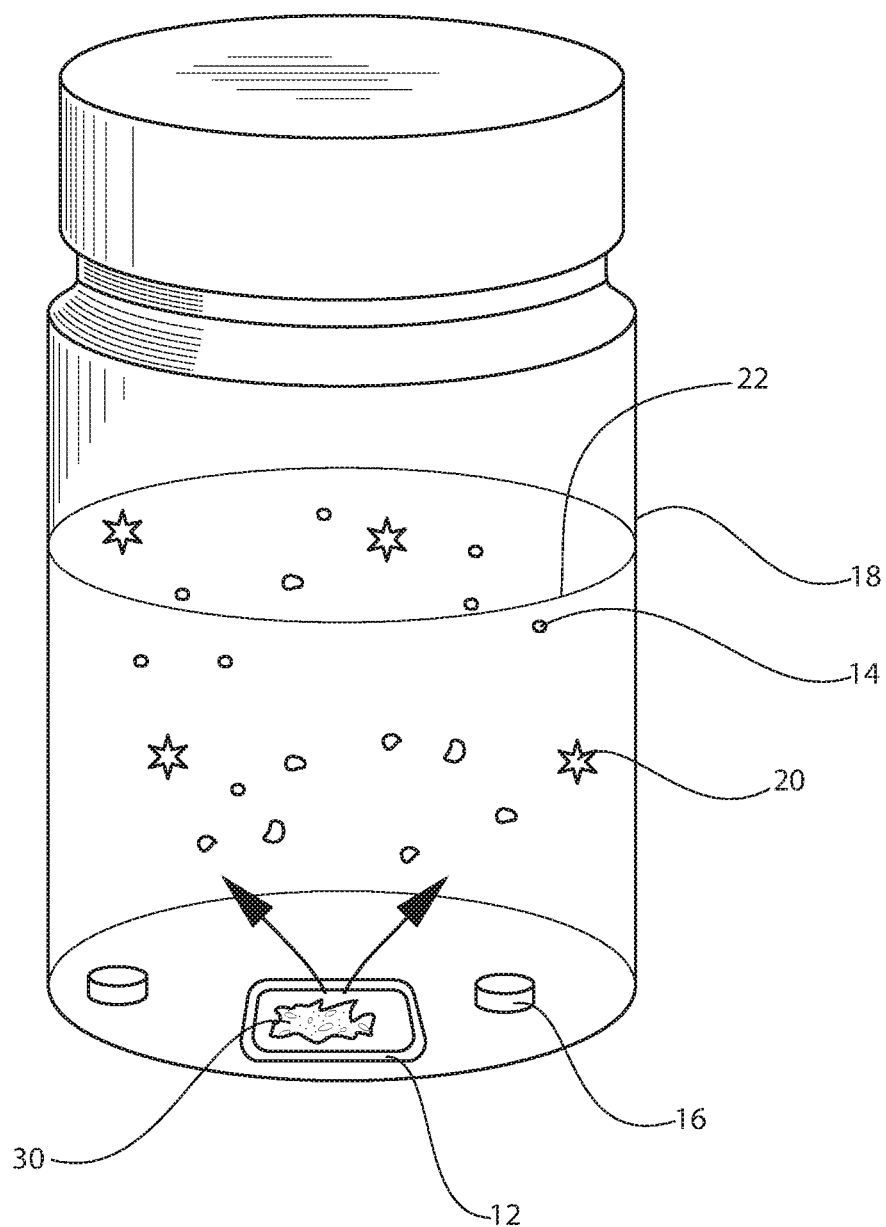
FIG. 2 is a side perspective view of the solidification system of FIG. 1 showing a packet releasing an absorbent composition.
Figure 3:
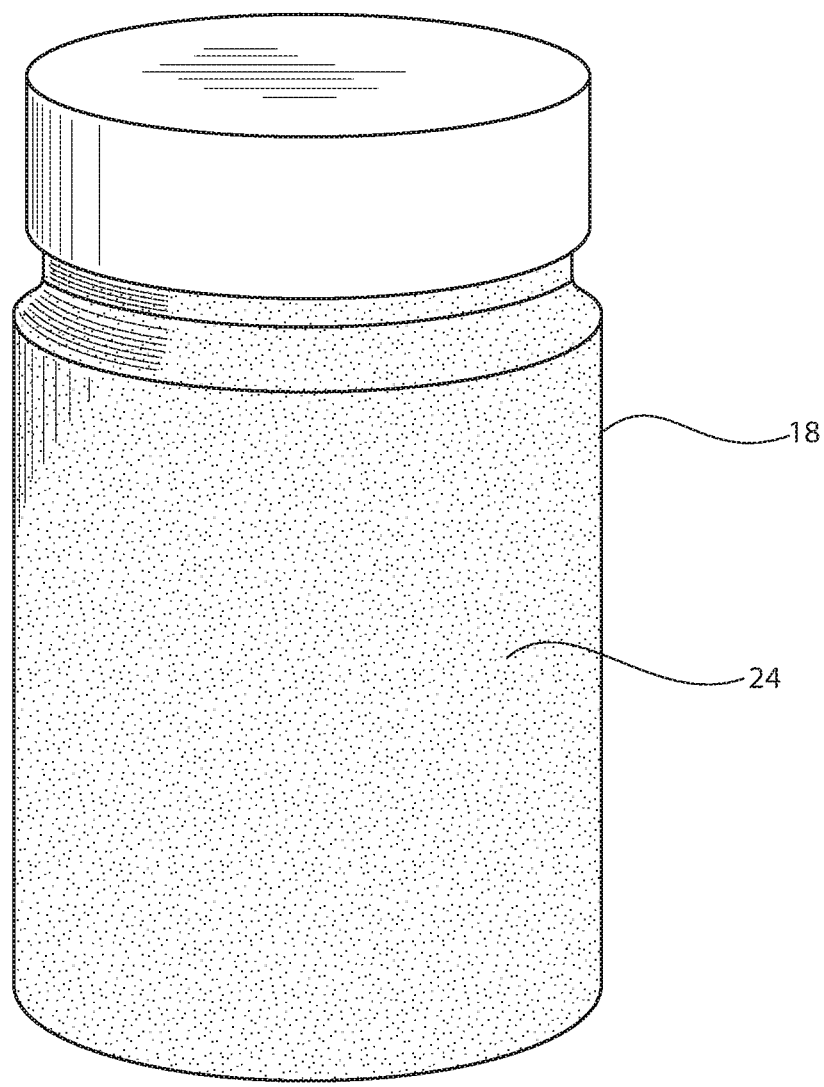
FIG. 3 is a side perspective view of the solidification system of FIG. 1 showing the contents of the container deactivated and solidified.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing embodiments of the disclosure and are not intended to limit the disclosure or any invention thereto. FIG. 1 shows one embodiment of a system for solidification of pharmaceutical wastes 10 including a medication container 18 having a lid 28, and containing medication for disposal 16 and a solidification packet 12.

Pharmaceutical wastes may include medications in any form, for example, unused medications, expired medicines, liquid medication, powder medications, pills and tablets, vialed, syringe or bag medications and/or IV medications.

The medication container 18 provides a housing for the user's prescribed medicine. The container may take on any number of shapes or sizes, by way of example, medication bottles, vials, bags, and/or syringes.

In one example, the system 12 may be an in-the-bottle solidification system, where the prescription bottle housing the medication serves as the container 18. This embodiment may be especially helpful for the residential user. In this example, no medications are required to be removed from the existing prescription bottles and the medications do not have to be handled or displaced to another container. In situations where others are caring for the sick, children or elderly, it is often not desirable to handle others' medications and Applicant's invention removes the requirement of handling of the pharmaceuticals. There is no requirement to place the medication in a larger receptacle, to delay from disposal or the requirement to shake or stir the container in order to deactivate the medication and solidify it for disposal.

Medication 16 for disposal may include, for example, unused medication, outdated medicine, left over medications, broken or contaminated medications, over-the-counter medications, and/or prescribed medications. The medication may be in any form, for example, pills, gels, creams, lozenges, tablets, and/or capsules.

Solidification packet 12, in one example, is made of any suitable water soluble film and/or paper. The packet may be made of dissolvable polyvinyl alcohol. The packet 12 includes at least a dissolvable portion 30. At least the dissolvable portion 30 should have a disintegration time and temperature suitable to the fluids in which it will be exposed. Compatibility of the packet 12 with its contents should also be considered. Packet 12 should provide a storage capacity without resulting in insolubility, rigidity or changes in packet 12 or its contents. Packets were tested by Applicant for compatibility and examples of compatible packets are dissolvable films that can be acquired from MonoSol, LLC, such as their models M7031, M7061, M8534, and M8900 (PXP6829) of water soluble film. Optionally, water soluble paper may be used. Packet 12 may be made entirely of a dissolvable packet or may include a dissolvable portion. The dissolvable portion of packet 30 allows packet 12 to be placed into container 18 prior to introducing fluids into container 18.

Packet 12 may be any shape. By way of example, the packet 12 may be circular, square, rectangular, and/or take on a cylindrical shape. Packet 12 may include a packet thickness ranging from about 1 mm to 1.5 mm. Packet 12 may be secured within the container 18, added to the container and/or housed loosely in the container. Packet 12 may be secured within the container 18 on a container bottom 34, and/or by way of example, on a container wall.

The system 10 may include an adhesive that secures the packet 12 within the container 18.

Enclosed within packet 12 is a quantity of an absorbent composition. The absorbent composition includes a plurality of superabsorbent polymer 14. The plurality of superabsorbent polymer may be surface cross-linked superabsorbent particles. Cross-linked superabsorbent particles may be internally and surface cross-linked superabsorbent polymers, one example as discussed in U.S. Pat. No. 7,291,674 to Kang, the entire disclosure being hereby incorporated by reference in its entirety.

Another example of a suitable superabsorbent polymer may be selected from natural, biodegradable, synthetic and modified natural polymers and materials. The term cross-linked used in reference to the superabsorbent polymer refers to any means for effectively rendering normally water-soluble materials substantially water-insoluble but swellable. Such a crosslinking means can include for example, physical entanglement, crystalline domains, covalent bonds, ionic complexes and associations, hydrophilic associations such as hydrogen bonding, hydrophobic associations or Van der Waals forces. Superabsorbent polymers have one or both of internal crosslinking and surface cross-linking. Surface crosslinking is any process that increases the crosslink density of the polymer matrix in the vicinity of the superabsorbent particle surface with respect to the cross-linking density of the particle interior. Examples of surface cross-linked superabsorbent polymers of the present disclosure are available from Stockhausen, Inc. of Greensboro, N.C. or from Zappa Tec, LLC of McLeansville, N.C., as AP95 and/or a superabsorbent of the FAVOR-PAC 500 series, or comparable SAP.

In one example, a FAVOR-PAC superabsorbent polymer may be used in the absorbent composition. The superabsorbent polymer may be FDA approved for usage with food grade products. The FAVOR-PAC polymer, by way of example, is an FDA approved polymer for usage with food. In this case, if the packet 12 were to burst and/or the absorbent composition come into contact with the medication prior to solidification, the medication would not be adversely affected by accidental contact with the polymer.

Figure 4:
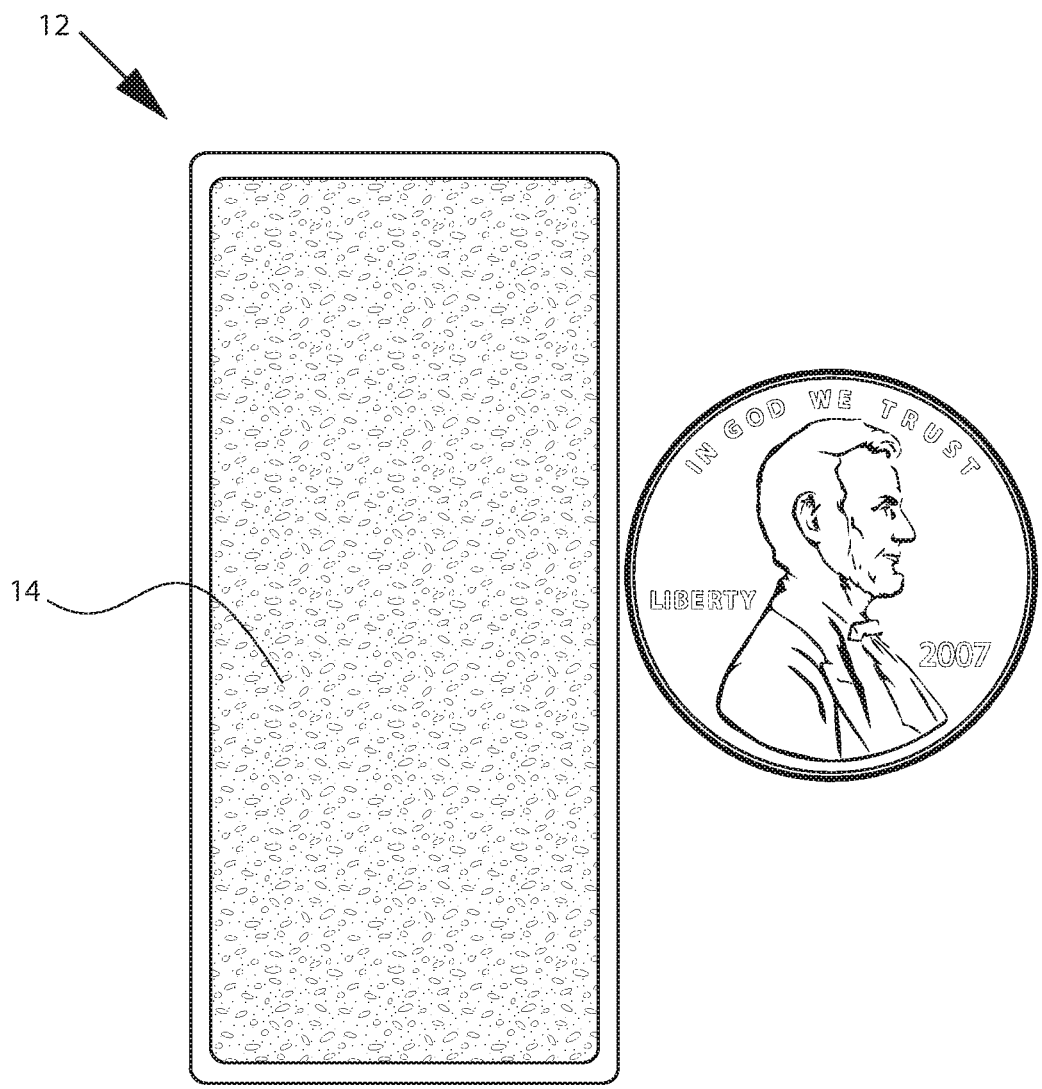
FIG. 4 shows one example of a micro-packet according to the present disclosure.

In some examples, packet 12, one example of which is shown in comparison to a coin size in FIG. 4, may be a micro-packet, containing enough superabsorbent polymer to inactivate and solidify the pharmaceutical wastes in smaller medicine containers. By way of example, the micro-packet may include about 1 g or less of superabsorbent polymer. In some embodiments, the micro-packet may include about 0.5 g to about 1 g or superabsorbent polymer. The micro packet, in this example, should container enough superabsorbent polymer to solidify the contents of the container, however, be structured to dimensions such that the micro-packet is still able to fit inside the container 18. Too little superabsorbent polymer in the packet 12 and firm solidification may not be achieved, too much superabsorbent polymer in the packer per the container size and the container could be breached. In some examples, the micro-packet may be circular. In other examples, the micro-packet may be rectangular. Any shape of micro-packet is considered within the scope of this disclosure.

Additional embodiments, may include a container 18 and a packet 12. The packet 12 may include an absorbent composition 14 having superabsorbent polymer. The superabsorbent polymer may be a single superabsorbent polymer. The superabsorbent polymer may be a combination of superabsorbent polymers. The packet may include a plurality of surface cross-linked superabsorbent particles that are surface cross-linked to maintain permeability and configured to prohibit gel-block during the introduction of the aqueous liquids. Without a superabsorbent polymer configured to be permeable in a fluid immersed environment, gel-block may occur, the fluids introduced into the container may seal off a portion of the polymer and cause gel-block, preventing firm solidification of the fluid and thus deactivation of medical wastes within the container may not be achieved. Considerations of packet compatibility with the absorbent polymer, the small amounts of superabsorbent polymer contained within the packet, achieving firm solidification with polymer in small, medication size containers when in liquid emersion environments, deactivation of medications and maintaining permeability to prevent gel-block are variables not at issue in the use of superabsorbent polymer in absorbent articles such as diapers, and present challenges Applicant recognized and has overcome.

Packet 12, with an enclosed absorbent composition 14, may be placed inside container 18, fluid 22 may be introduced without removing medication or handling and supplying packet 12. When medication is ready for disposal, liquid, for example tap water, may be introduced into the container 12. Packet 14 dissolves in whole or in a dissolvable portion, releasing the absorbent composition 14. The absorbent composition 14 scatters throughout the aqueous liquid and the superabsorbent particles absorb the liquid and the granular absorbent composition 14 becomes a gel-like substance as it solidifies the liquid. In some examples, the absorbent composition 14 is enclosed within the dissolvable packet 14 and the packet 14 is housed within the prescription bottle, along with the medication, so that the packet 14 is prepackaged in the container when the consumer receives his/her medicine. In some examples, where the consumer is receiving prescribed medication, the packet 14 may be placed in the medicine bottles at variable times, for example, when the medicine bottles are manufactured, when the medicine bottles are packaged for shipping, for example to a pharmacy, at the time the medicine bottles are prepared with medications, such as at a pharmacy, when medications are packaged in a container and shipped to stores for shelving and/or by a consumer after receiving their medication.

The absorbent composition 14 may include an agent for deterring unintended usage. In one example the agent may be a denaturing agent. In another example the agent may be a bittering agent. In one example the bittering agent may be denatonium benzoate (for example, Bitrex®). The denaturing agent acts to deactivate the medications rendering them unfit for consumption and the bittering agent acts to repel human consumption. Applicant's invention as disclosed may deactivate, render unsuitable for consumption and solidify the pharmaceutical waste. In some examples, the absorbent composition 14 may include about 0.1 g of a bittering agent. In other examples, a bittering agent may be denatonium saccharide.

In some examples, the absorbent composition may be released from the packet in the container when exposed to fluid and solidify in under about 2.5 minutes. In other examples, the absorbent composition may solidify in the container in about 2 to 5 minutes. In other examples, the absorbent composition may solidify in the container in about 2.5 to 3 minutes. In other examples, the absorbent composition may solidify in the container in over 3 minutes.

In some embodiments, the aqueous fluid added to the container and solidified by the absorbent composition, is firmly solidified so that no substantial amount of fluid spills out when the container is placed on its side after solidification. In other embodiments, the solidified content 24 of container 18 maintains firm solidification for at least 24 hours. In some examples, firm solidification may be maintained for at least 3 days. In other examples, firm solidification may be maintained for at least 5 days or more. Firm solidification for a determined period of time may allow for safe disposal of the medication and container to the users waste basket and ensure solidified disposal over the course of waste pickup and delivery to a landfill.

No supplemental bottle or mixing is required, conserving on resources by utilizing the original medicine bottle as the container 18 and simplifying disposal. There is no complicated machinery or devices to purchase or maintain, which would be difficult for in-home solidification of pharmaceutical wastes. With Applicant's disclosed inventions, consumers are able to dispose of pharmaceutical wastes as need, on the spot, and they are not required to wait for proper disposal.

In Applicant's disclosed inventions, polymer may already be incorporated into the prescription bottle through a packet housed within the bottle when the prescription is dispensed, reducing the workload on the consumer/caregiver. There is, in this example, nothing for the consumer to purchase or to store. The polymer is FDA approved for usage with food articles for safely. The system may not only deactivate and/or make unfit for consumption the medication for disposal but also solidify the contents of the container for safe and effective disposal in an improved and economical manner.

In some embodiments, the packet 12 may also house a disinfecting agent, for example a chlorine agent, for example, when a packet is to be introduced into the container after a user has determined the medication is ready for disposal.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A method for solidification, the method comprising:
   introducing an aqueous liquid into a container containing pharmaceutical waste and a dissolvable micro-packet,
      wherein the dissolvable micro-packet comprises a dissolvable portion and a non-dissolvable portion,
      wherein the dissolvable micro-packet contains an absorbent composition, the absorbent composition comprising about 1.0 g or less of a surface cross-linked superabsorbent polymer and about 0.1 g of denatonium benzoate or denatonium saccharide configured to make the absorbent composition and the pharmaceutical waste unsuitable for consumption when solidified,
      wherein the dissolvable micro-packet further contains a disinfecting agent,
      wherein the dissolvable micro-packet is secured to an inner bottom surface of the container by an adhesive,
      wherein the surface crosslinked superabsorbent polymer is a polymer FDA approved for use as an indirect food additive, wherein the container is a prescription medication bottle, wherein the dissolvable micro-packet has a thickness between 1 mm and 1.5 mm, and wherein an amount of the aqueous liquid introduced into the container is sufficient to at least partially dissolve the dissolvable micro-packet;

at least partially dissolving the dissolvable micro-packet in the aqueous liquid such that the absorbent composition is exposed to the aqueous liquid; and solidifying the absorbent composition and the aqueous liquid within about 2.5 minutes after the absorbent composition is exposed to the aqueous liquid, the absorbent composition and aqueous liquid remaining solidified for at least five days after initial solidification.

2. The method of claim 1 wherein the surface crosslinked superabsorbent polymer is a swellable, insoluble, surface crosslinked polymer.

3. The method of claim 1 wherein the absorbent composition includes a denaturing agent.

4. The method of claim 1, wherein the surface crosslinked superabsorbent polymer maintains permeability while the absorbent composition and the pharmaceutical waste are solidified, such that gel-block is prevented.

5. The method of claim 1, wherein the absorbent composition and the pharmaceutical waste are solidified without about 2.5 minutes in the absence of agitation of the container.

6. The method of claim 1, wherein the disinfecting agent comprises a chlorine agent.

* * * * *